(12) United States Patent
Jin et al.

(10) Patent No.: US 9,047,375 B2
(45) Date of Patent: Jun. 2, 2015

(54) INTERNET VIDEO CONTENT DELIVERY TO TELEVISION USERS

(75) Inventors: Zhiying Jin, Lexington, MA (US); Alex Sakharov, Natick, MA (US); Fang Zhu, Woburn, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 931 days.

(21) Appl. No.: 12/841,377

(22) Filed: Jul. 22, 2010

(65) Prior Publication Data

US 2012/0023126 A1 Jan. 26, 2012

(51) Int. Cl.
*G06F 17/30* (2006.01)

(52) U.S. Cl.
CPC ...... *G06F 17/3082* (2013.01); *G06F 17/30823* (2013.01)

(58) Field of Classification Search
USPC ......................................................... 707/732
See application file for complete search history.

(56) References Cited

U.S. PATENT DOCUMENTS

| | | | | |
|---|---|---|---|---|
| 8,019,709 B2* | 9/2011 | Norton et al. | ................... | 706/45 |
| 8,229,914 B2* | 7/2012 | Ramer et al. | ................. | 707/709 |
| 2002/0133826 A1* | 9/2002 | Ohyama | ........................ | 725/87 |
| 2002/0162112 A1* | 10/2002 | Javed | .............................. | 725/87 |
| 2005/0028206 A1* | 2/2005 | Cameron et al. | ................ | 725/46 |
| 2005/0273827 A1* | 12/2005 | Javed et al. | .................... | 725/90 |
| 2008/0222106 A1* | 9/2008 | Rao et al. | ......................... | 707/3 |
| 2008/0307339 A1* | 12/2008 | Boro et al. | .................... | 715/764 |
| 2009/0125459 A1* | 5/2009 | Norton et al. | ................... | 706/10 |
| 2012/0023126 A1* | 1/2012 | Jin et al. | ....................... | 707/769 |

* cited by examiner

*Primary Examiner* — James Trujillo
*Assistant Examiner* — Kurt Mueller

(57) ABSTRACT

A method for delivering video content to a user, including accessing a website that hosts a plurality of video content, causing a search to be performed of the website based on a keyword in the set of keywords, identifying, based on a result of the search, a set of video content, of the plurality of video content, related to the keyword, identifying a format of a particular video content in the set of video content, determining whether the format is compatible with a video client device, and outputting identifying information that identifies the particular video content when the format is compatible with the video client device, where the identifying information allows the video client device to access the particular video content.

19 Claims, 10 Drawing Sheets

INTERNET VIDEO CONTENT DELIVERY TO TELEVISION USERS

BACKGROUND

Online video content has become widely available to computer users via Internet websites, such as YouTube, Veoh, Hulu, etc. These websites may be accessed by computer users by clicking links, or entering Uniform Resource Locators ("URLs"). When a computer user arrives at one of these websites, the computer user may search for video content. On the other hand, television set-top boxes ("STBs"), which typically provide television content for display on a television, lack the ability to search for, and deliver, video content from such websites.

DETAILED DESCRIPTION OF PREFERRED EMBODIMENTS

The following detailed description refers to the accompanying drawings. The same reference numbers in different drawings may identify the same or similar elements. The following detailed description does not limit the invention.

Figure 1A:
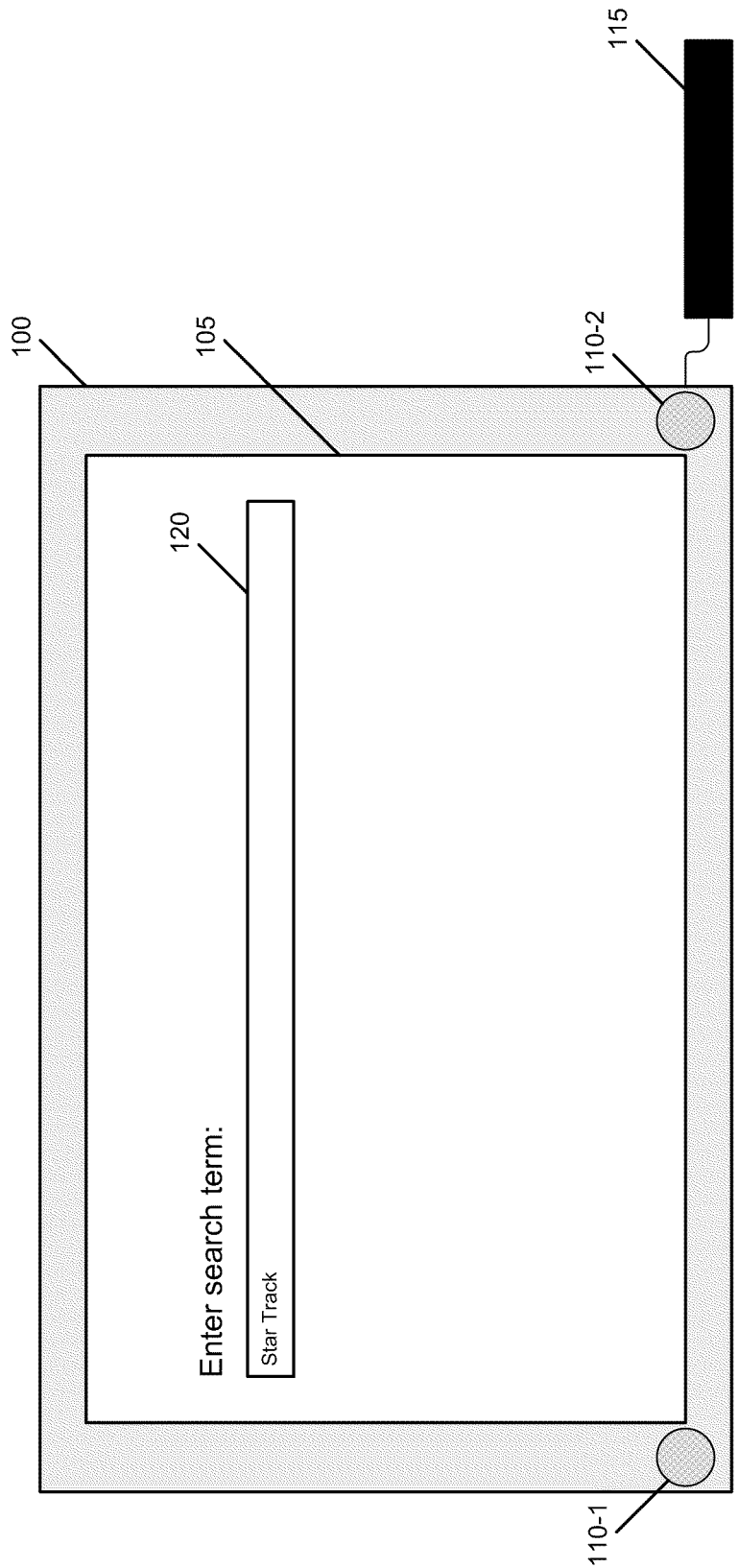
FIGS. 1A-C illustrate an overview of searching for, and receiving, video content, according to an example embodiment.
Figure 1B:
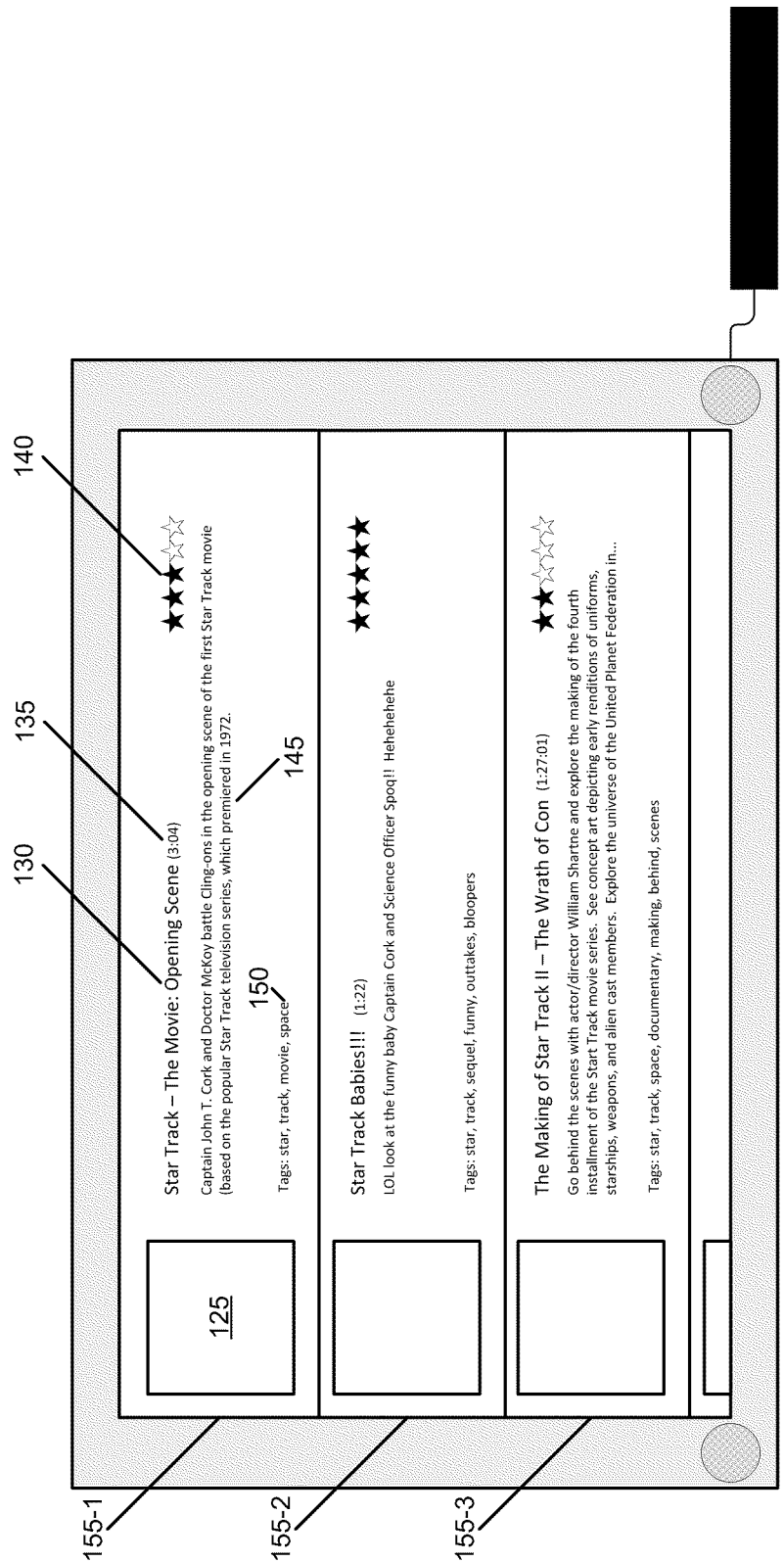
Figure 1C:
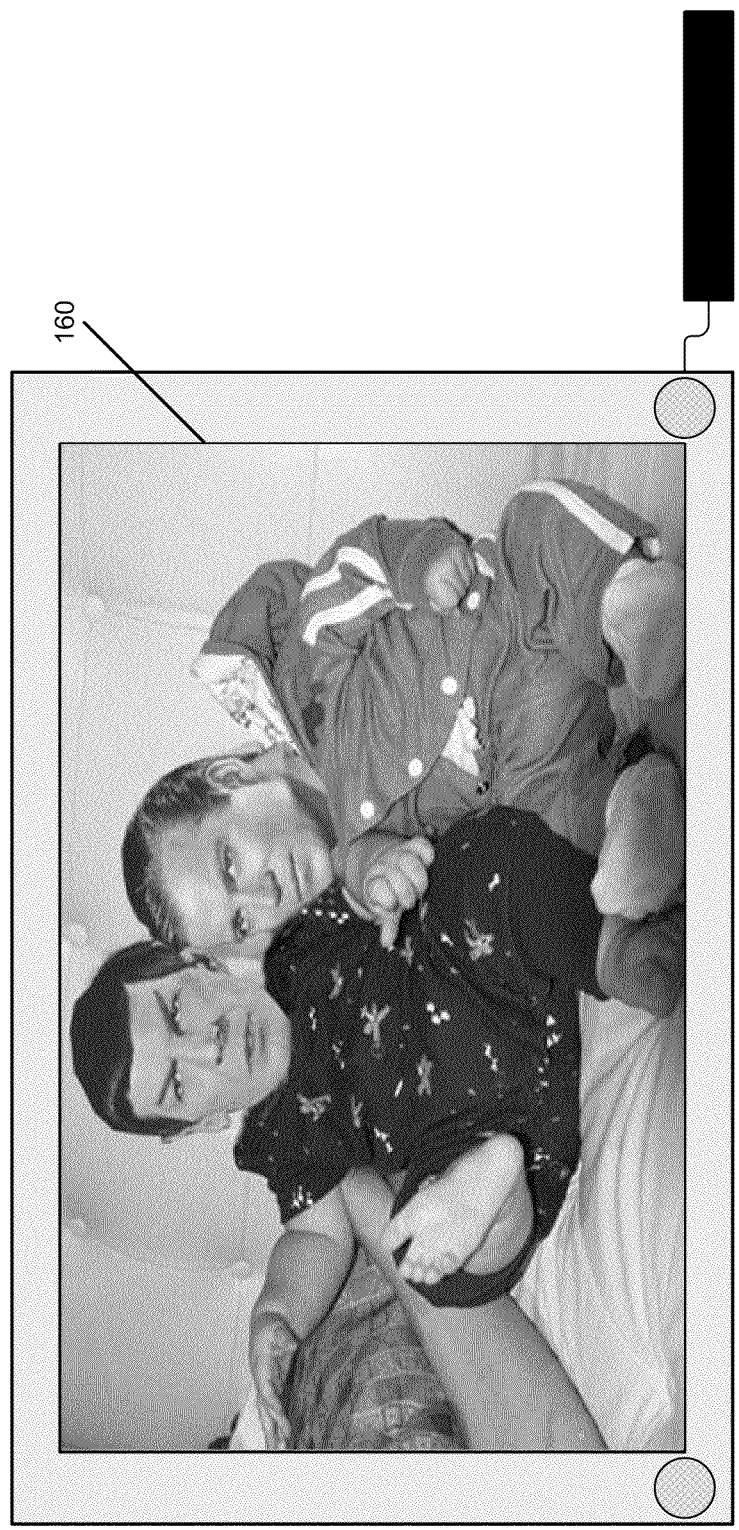

FIGS. 1A-C illustrate an overview of searching for, and receiving, video content, according to an example embodiment. FIG. 1A illustrates television 100, which may include a visual output device (e.g., screen 105), an audio output device (e.g., speakers 110-1 and 110-2), and/or other components (not pictured). Television 100 may connect to STB 115, which may provide video and/or audio content for playback on screen 105 and/or through speakers 110-1 and 110-2.

In FIG. 1A, screen 105 displays search box 120 for searching for video content to be shown on television 100. Television 100 may display search box 120 in response to receiving a signal output by STB 115. In search box 120, a user, of television 100 and STB 115, may enter a search term. This search term may be entered using a remote control, or some other input device (not pictured), that communicates with STB 115. In this figure, a search term "Star Track" has been entered in search box 120.

FIG. 1B illustrates a video content search result information screen, which may be displayed by television 100. The video content search result information screen may include video content search result information 155-1, 155-2, and 155-3 (collectively referred to as "video content search result information 155"). The video content search result information 155 may be provided, through the television 100, by the STB 115. Video content search result information 155 may include information about video content available via the Internet (e.g., video content at a website that provides video content, such as YouTube, Hulu, Joust, Crackle, etc.). For instance, video content search result information 155-1 may include a thumbnail 125, title 130, length 135, snippet 145, rating 140, and/or a set of tags 150 associated with a particular video.

Thumbnail 125 may include one video frame of the particular video content item. Thumbnail 125 may alternatively include multiple video frames of the particular video content item. Length 135 may be a length, or duration, of the particular video content item, and may be expressed in minutes, seconds, and/or hours. Snippet 145 may include a brief textual description of the particular video content item. Rating 140 may be a rating assigned by viewers of the particular video content item, and may be expressed in a number of different ways, such as using a numerical scale, a number of stars, etc. Tags 150 may include words that have been identified as being relevant to the particular video content item.

Different video content search result information screens may include additional, less, or different information than illustrated in this example. Moreover, video content search result information not displayed on the video content search result information screen may be navigated to (e.g., by scrolling, going to a next page, etc.).

A user may select video content associated with a particular displayed video content information 155. To make this selection, the user may use an input device (e.g., a remote control) that communicates with the STB 115. FIG. 1C illustrates the television 100 displaying selected video content 160, upon selection of the video content information 155 that is associated with the video content 160.

Figure 2:
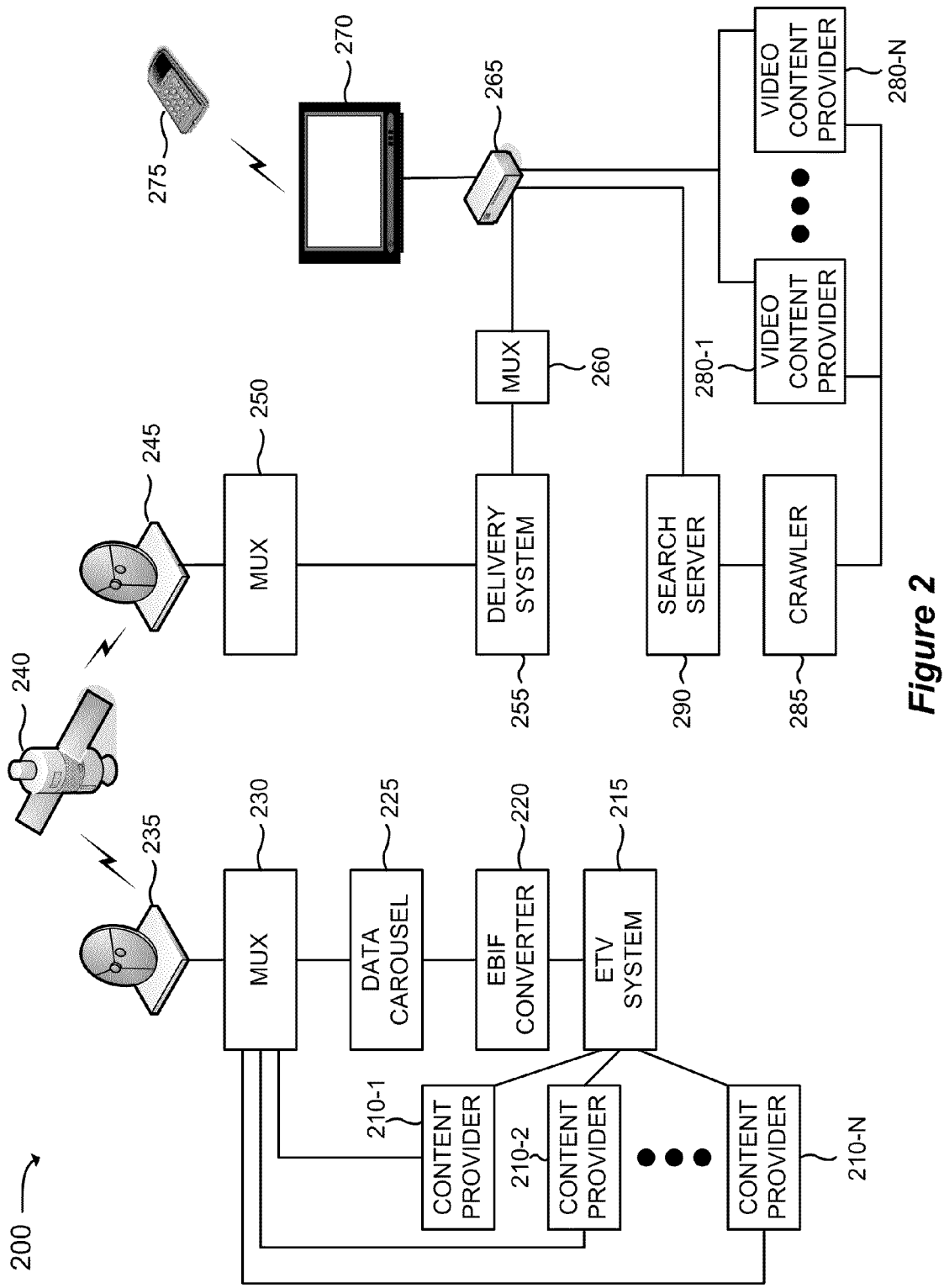
FIG. 2 is a diagram of an example network in which systems and/or methods described herein may be implemented.

FIG. 2 is a diagram of an example environment 200 in which systems and/or methods described herein may be implemented. As shown in FIG. 2, environment 200 may include content providers 210-1, 210-2, . . . , 210-N (where N≥1) (collectively referred to as "content providers 210"), Enhanced Television (ETV) system 215, Enhanced TV Binary Interchange Format (EBIF) converter 220, data carousel 225, multiplexer (MUX) 230, satellite uplink 235, satellite 240, satellite downlink 245, MUX 250, delivery system 255, MUX 260, video client 265, video display device 270, remote control 275, search server 290, and crawler 285. In practice, environment 200 may include additional, fewer, different, or differently arranged devices than are shown in FIG. 2. For example, environment 200 may include a transmission medium that includes devices other than satellites and satellite uplinks and downlinks.

Also, two or more of these devices may be implemented within a single device, or a single device may be implemented as multiple, distributed devices. Further, while FIG. 2 shows direct connections between devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content providers 210 may include any type or form of content providers. For example, content providers 210 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., streaming content from websites). Content providers 210 may produce media streams (e.g., television broadcasts). A "media stream," as used herein, may refer to a stream of content that includes video content, audio content and/or text content.

ETV system 215 may include a device that may work with content providers 210 to generate interactive content for the media streams. ETV system 215 may acquire, decode, and/or present information, and/or execute actions contained in an EBIF signal in order to present an interactive multimedia page for display to a user. For example, ETV system 215 may generate interactive content and associated signaling information (e.g., triggers) that are associated with the media streams. EBIF converter 220 may include a device that may process the interactive content and associated signaling information to conform to the EBIF standard. EBIF converter 220 may output EBIF-compliant content and signaling information. Data carousel 225 may include a device that may process the EBIF-compliant content and signaling information to generate multiple data carousels on multiple separate data packet identifiers (PIDs) as part of an MPEG-2 single program transport stream (SPTS). For example, a first PID may contain EBIF-compliant content and a second PID may contain the signaling information.

MUX 230 may include a multiplexer device that may receive the media streams from content providers 210 and the EBIF-compliant content and associated signaling information from data carousel 225 and multiplex, or otherwise combine, this data to create an enhanced media stream. Satellite uplink 235 may include a satellite transmitter that may receive the enhanced media stream, process the enhanced media stream for transmission, and transmit the enhanced media stream to satellite 240. Satellite 240 may include a stationary or orbiting communication satellite that may receive the enhanced media stream and relay the enhanced media stream to satellite downlink 245.

Satellite downlink 245 may include a satellite receiver that may receive the enhanced media stream from satellite 240, process the enhanced media stream for transmission, and transmit the enhanced media stream to MUX 250. MUX 250 may include a multiplexer device that may process the enhanced media stream for transmission to delivery system 255.

Delivery system 255 may include a device, or a collection of devices, that may receive the enhanced media stream and process the enhanced media stream for transmission according to a particular protocol, such as the asynchronous serial interface (ASI) format. In another implementation, delivery system 255 may work with one or more other devices to generate interactive content and associated signaling information and/or to embed interactive content and associated signaling information into a media stream. MUX 260 may include a multiplexer device that may perform some form of modulation on the enhanced media stream, such as quadrature amplitude modulation (QAM).

Video client 265 may include a device that may receive and process the enhanced media stream from MUX 260. In one implementation, video client 265 may take the form of a STB, such as STB 115. In another implementation, video client 265 may include a computer device, a cable card, a communication device (e.g., a telephone, such as a voice over Internet protocol (VoIP) telephone or a mobile telephone, or a personal digital assistant (PDA)), or the like.

Video client 265 may perform decoding and/or decryption functions on the enhanced media stream received from MUX 260. Video client 265 may also receive, decode, and store information and updates associated with television content in the memory of video client 265 (e.g., television content that has been recorded). Video client 265 may retrieve stored television content and may process and/or present television content to video display device 270 for display.

Video client 265 may perform other functions relating to the storage and playback of video content, such as DVR functions. Video client 265 may further perform Internet-based content retrieval functions, such as searching and/or retrieving web pages or other Internet-based content, and delivering Internet-based video content to a user (e.g., receiving a video content search query via remote control 275, retrieving video content from video content providers 280, presenting the video content on video display device 270, etc.).

In some embodiments, video client 265 may include separate physical data interfaces for receiving signals. For instance, video client 265 may include a first physical data interface (e.g., an optical interface) for receiving television signals (e.g., from delivery system 255 via MUX 260), and a second physical data interface (e.g., an Ethernet interface) for receiving network signals (e.g., from search server 290 and/or video content providers 280).

Video display device 270 may include any device capable of receiving and/or reproducing video and/or audio signals. In one implementation, video display device 270 may take the form of a television, such as television 100. In another implementation, video display device 270 may include a computer monitor, a display of a communication device (e.g., a telephone, such as a VoIP telephone or a mobile telephone, or a PDA), or the like. Video display device 270 may be connected to video client 265 and may receive signals from video client 265 for purposes of displaying content, such as television content, Internet-based content, etc.

Remote control 275 may include any device capable of remotely controlling the operation of video client 265 and/or video display device 270. Remote control 275 may take the form of a remote control device similar to a television or STB remote control device, a game controller, a keyboard, a keypad, a PDA, a mobile telephone, or the like. Remote control 275 may provide commands to video client 265 and/or video display device 270 by transmitting signals, such as wireless signals (e.g., infrared or Bluetooth) or signals transmitted over wires (e.g., over a universal serial bus (USB) interface or the like), to a reader associated with video client 265 and/or video display device 270.

Video content providers 280-1, . . . , 280-N (collectively referred to as "video content providers 280") may include Internet-based content providers. Video content providers 280 may provide content through a network, such as the Internet. Video content providers 280 may include Internet websites (e.g., YouTube, Hulu, Veoh, etc.), which feature video content (alternatively referred to as "videos"). Video content providers 280 may stream video content. Such video content, although referred to herein as "video" content, may include an audio content component, in addition to a visual content component.

In some examples, a visual content component of a particular video may include a moving visual image. Furthermore, the visual component of a video may include a single image, a single background color, a set of still images, a blank screen, or any combination of the above. An audio content component, in some examples, may include recorded sound effects, music, dialog, or any other audible sound. Some videos may have an audio content component, but the audio content component could have very little sound (e.g., intermittent sounds, a barely-audible hiss, etc.), or no sound at all.

Video content providers 280 may provide location identifiers (e.g., URLs) that identify web pages on which videos appear. Video content providers 280 may also provide location identifiers that directly identify videos themselves, instead of identifying a web page on which a video appears.

Additionally, video content providers 280 may provide computer code (e.g., Hypertext Markup Language ("HTML"), or some other type of code), which may be used for various functions related to video content. For example, these functions may include changing the size of the video content (e.g., displaying a video in "full screen" mode, displaying a video in a default size, displaying a video in a size that is smaller than the default size, displaying a video in a size that is larger than the default size, etc.). These functions may also include changing the video resolution (e.g., 480i, 480p, 720p, 1080i, 1080p, or some other resolution). These functions may further include changing the audio quality and/or the number of audio channels. Combinations of the above functions, and/or other functions may be also provided.

Crawler 285 may include a device that identifies video content (e.g., video content made available by video content providers 280). Crawler 285 may aggregate a list of keywords. Crawler 285 may then search for video content, provided by video content providers 280, that is associated with one or more of the keywords in the list. In performing this search, crawler 285 may "crawl" documents (e.g., web pages) provided by the video content providers 280. By crawling these documents, crawler 285 may identify video content data, such as location identifiers, metadata, and/or other data, for video content associated with the matching keywords. Crawler 285 may then provide the identified video content data to search server 290 for storage in search server 290.

Crawler 285 may perform other functions, in addition to those listed above. For instance, crawler 285 may perform a periodic check of some, or all, of the video content data stored by search server 290 in order to verify that videos associated with the stored video content data are still available, or active. This process, performed by crawler 285, may be in lieu of, or in addition to, a similar process performed by search server 290.

Search server 290 may include a device that receives and stores video content location information (such as URLs), video content metadata (e.g., information regarding title, length, rating, director, actor, etc.), and/or other data associated with video content. This data may be obtained by crawler 285. Search server 290 may receive video content search queries from video client 265. After receiving such a video content search query, search server 290 may access the stored information, and provide relevant information (e.g., location identifiers and/or metadata associated one or more relevant videos) back to video client 265. In turn, video client 265 may present the relevant information received from search server 290, in order to allow a user to select a particular video for viewing.

Search server 290 may also verify that video content is compatible with video client 265. Search server 290 may further perform a periodic check of some, or all, of the video content data stored by search server 290 in order to verify that videos associated with the stored video content data are still available, or active. Search server 290 may employ one or more indexing techniques in order to provide fast retrieval of video content data upon receiving a video content search query.

Figure 3:
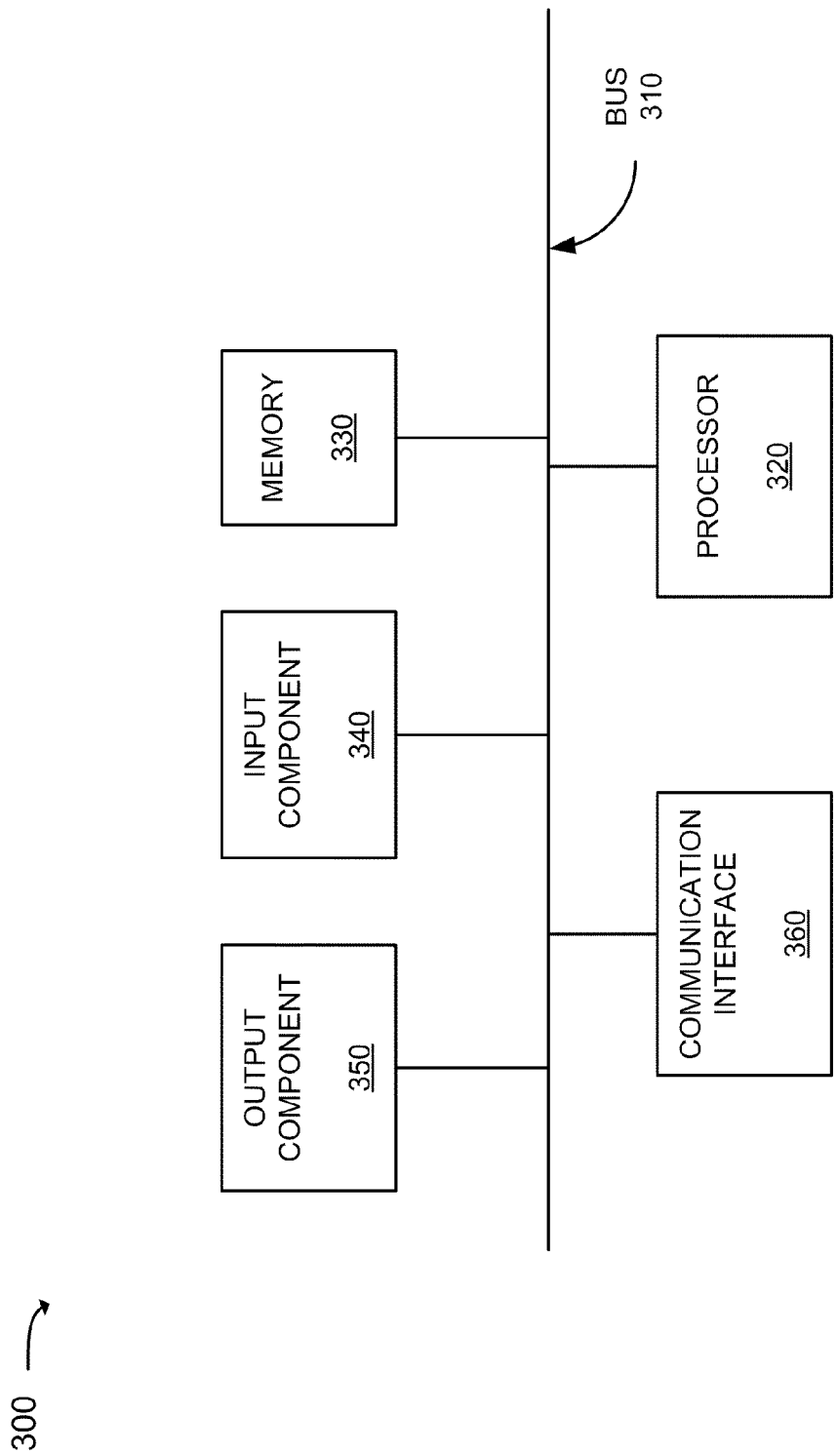
FIG. 3 is a diagram of example components of a device of FIG. 2.

FIG. 3 is a diagram of example components of a device 300. Each of the devices illustrated in FIG. 2 may include one or more devices 300. Device 300 may include a bus 310, a processor 320, a memory 330, an input component 340, an output component 350, and a communication interface 360. In another implementation, device 300 may include additional, fewer, different, or differently arranged components. Some non-limiting examples of device 300, with additional and/or different components, are discussed below.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, or the like. Communication interface 360 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 300 may include more than one communication interface 360. For instance, device 300 may include an optical interface and an Ethernet interface.

As will be described in detail below, device 300 may perform certain operations relating to delivering video content (e.g., Internet-based video content). Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause to processor 320 to perform processes described herein. Alternatively, hardwired circuitry may be used in place of or in combination with software instructions to implement processes described herein. Thus, implementations described herein are not limited to any specific combination of hardware circuitry and software.

The software instructions may be read into memory 330 from another computer-readable medium or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
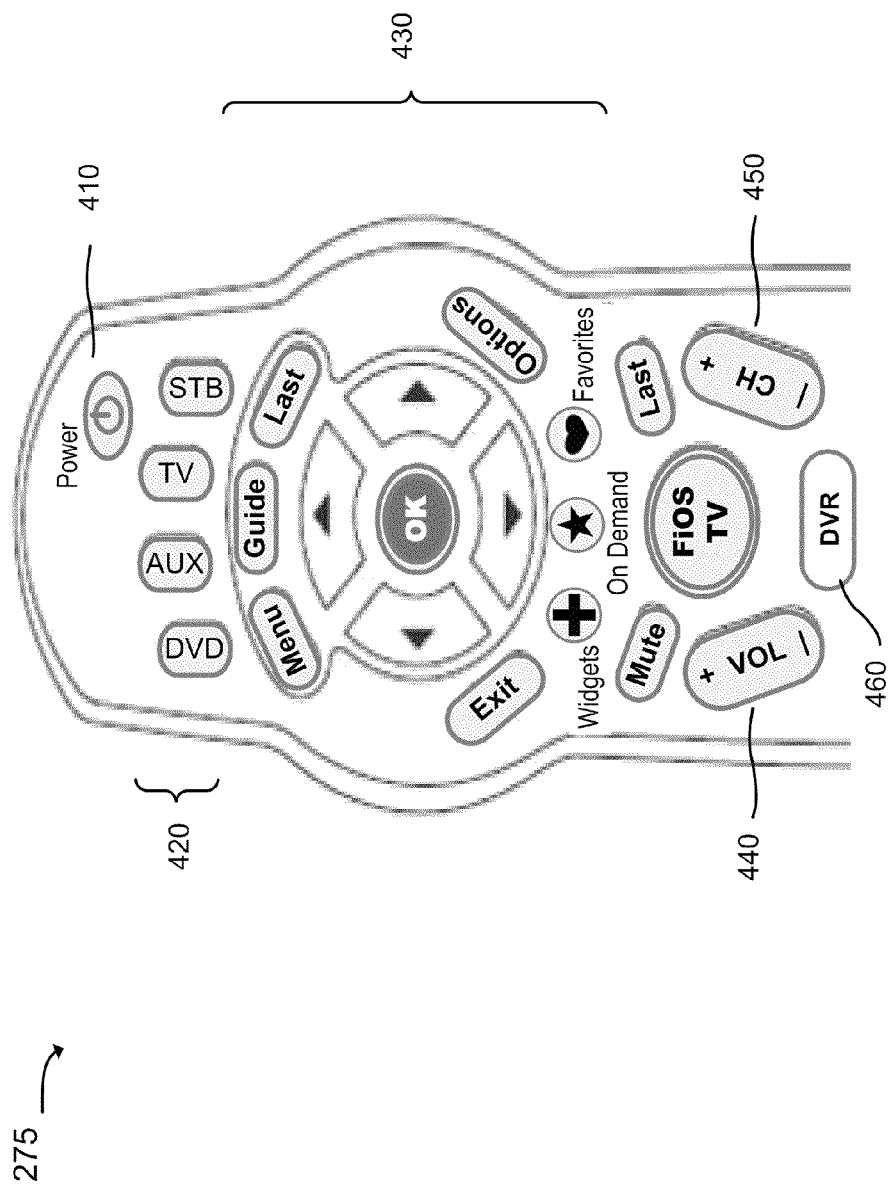
FIG. 4 is a diagram of an example portion of the remote control device of FIG. 2.

FIG. 4 is a diagram of an example portion of remote control 275. As shown in FIG. 4, remote control 275 may include buttons 410-460 that may cause video client 265 and/or video display device 270 to perform various functions. For example, remote control 275 may include a power button 410, device selection buttons 420, interactive content buttons 430, volume button 440, channel button 450, and DVR button 460.

Power button 410 may cause a controlled device (e.g., video client 265, video display device 270, or another device, such as a receiver, a VCR, or a DVR player) to power up or down. Device selection buttons 420 may identify a device to be controlled, such as video client 265, video display device 270, or another device, such as a receiver, a VCR, or a DVR player.

Interactive content buttons 430 may include buttons for displaying and interacting with television content. For example, one or more of buttons 430 may be used to activate or deactivate a search and/or playback for video content from a video content provider 280. Volume button 440 may cause a controlled device to change its volume setting. Channel button 450 may cause a controlled device to change its channel setting. DVR button 460 may cause a DVR program schedule to be displayed that may include information associated with television content that the user has selected for recording, play back, etc. Additional buttons, such as number or letter buttons (not pictured), may be used for any of the above-mentioned functions, or for additional functions.

While FIG. 4 illustrates example buttons of remote control 275, in another implementation, a different type of remote control device may be used to cause video client 265 and/or video display device 270 to perform various functions associated with video content delivery. In another implementation, a user may control video client 265 and/or video display device 270 by pressing certain buttons on one or both devices (e.g., video client 265 and/or video display device 270) and/or another communication or control device. In yet another implementation, a computer, a cellular/mobile phone, a personal digital assistant (PDA) and/or another device capable of wireless communications (e.g., infrared, Bluetooth, and/or other wireless capabilities) may control video client 265 and/or video display device 270.

Figure 5:
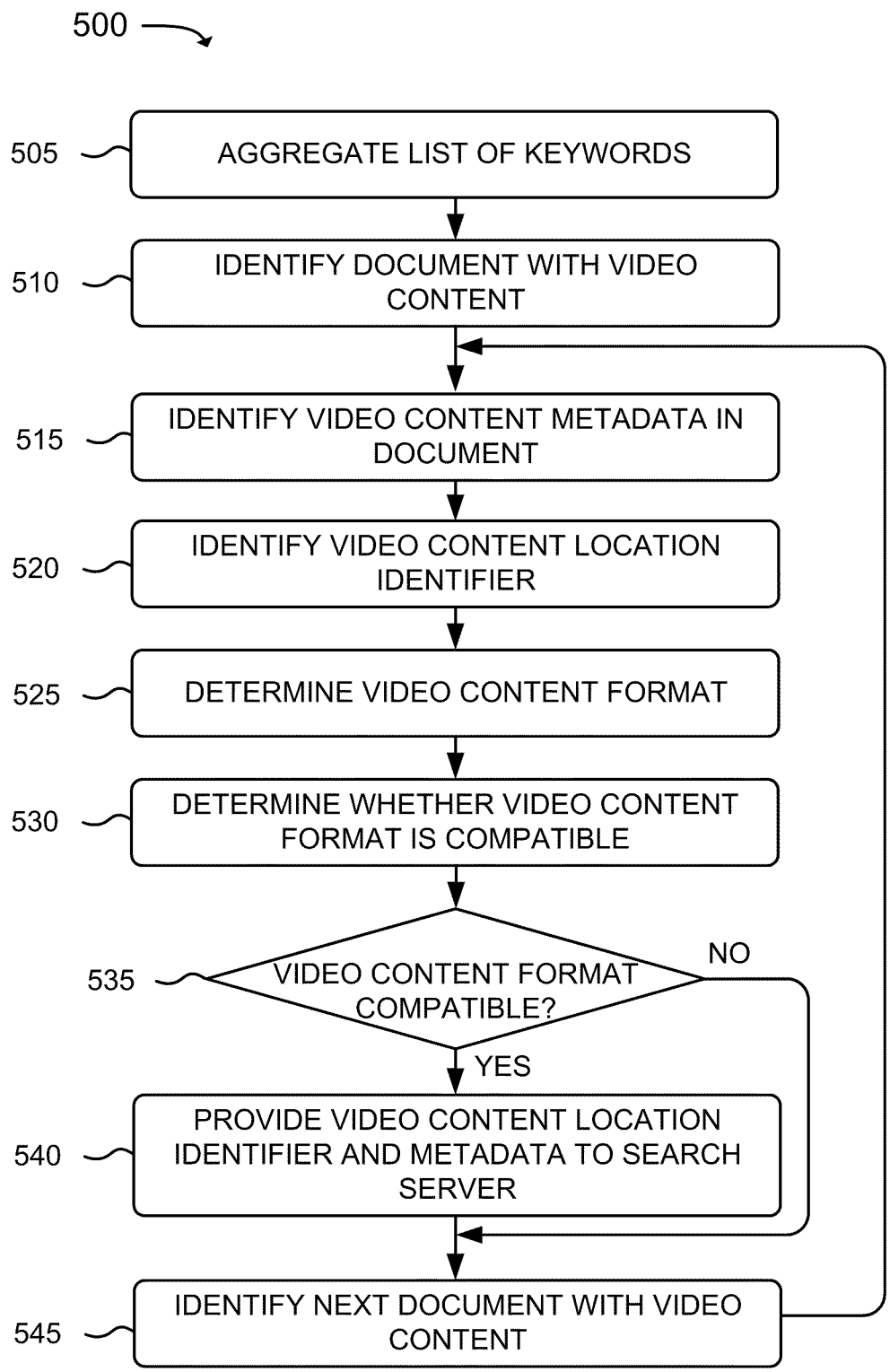
FIG. 5 is a flowchart of an example process for crawling documents that include video content.

FIG. 5 is a flowchart of an example process 500 for crawling documents that include video content. Process 500 may be performed by crawler 285. In other implementations, process 500 is performed by another device, or set of devices. Process 500 may include aggregating a list of keywords (block 505). For example, crawler 285 may aggregate the list of keywords. Aggregating the list of keywords may include receiving a list of keywords by an automated process. This automated process may obtain a list of the top search terms searched for by one or more search engines (e.g., Yahoo, Ask Jeeves, Bing, etc.) over a period of time (e.g., a day, a week, a month, or any other span of time). These search engines may generate, and make freely available, these lists of top search terms. Crawler 285 may automatically retrieve these lists of top search terms at a predetermined interval (e.g., every day, every week, etc.). Also, or alternatively, this automated process may obtain a list of "words of the day" from websites that offer a "word of the day."

Also, or alternatively, this automated process may analyze websites of video content providers 280 to identify popular terms, or terms that appear frequently, on the websites. For example, a term may be determined to be "popular" if it makes up more than a predetermined percentage of the total number of terms that appear in connection with selected documents on the website. In some implementations, a term may be "popular" if it appears more than a threshold number of times. Other ways of determining whether a term is "popular" may be used in combination with, or in lieu of, these examples.

Also, or alternatively, the automated process may analyze a search log that indicates video content search query terms received by search server 290. Search server 290 may store such a query log in a memory of search server 290. Crawler 285 may store the query log, or a copy of the query log. The query log may also be stored in an external database. In some implementations, search server 290 may periodically (e.g., every hour, every day, every week) provide an updated query log to crawler 285 for analysis by crawler 285. Also, or alternatively, crawler 285 may utilize a dictionary in order to determine a set of terms to use in the crawling process.

Also, or alternatively, crawler 285 may receive a list of keywords (or at least a portion of the list) from a human operator. The list of keywords received from a human operator may either replace or supplement a list of keywords received by the automated process.

The list of keywords may include 500, 1,000, 10,000, or any specified number of keywords. In some implementations, the list of keywords is limited to a predefined number of keywords, such that a keyword in the list may be replaced by a new keyword when the list is full. In some implementations, the list of keywords does not have a predefined limit, and may grow to any unlimited size. In some implementations, the list of keywords may periodically be reduced in size, either manually or by an automated process.

A "keyword" itself may be defined as a single alphanumeric string. An alphanumeric string may be defined as a string that does not include spaces or punctuation marks. Alternatively, an alphanumeric string may include one or more spaces or punctuation marks. However, in some implementations, a keyword may include multiple alphanumeric strings (e.g., the phrase "Star Track" may be considered as a single keyword).

A document with video content may be identified (block 510). For example, crawler 285 may identify the document with video content. As mentioned above, a document may include a web page. The document may be a web page on a website, accessible via the Internet, provided by a video content provider 280. The document may include links to, descriptions of, and/or thumbnails of multiple different videos.

Crawler 285 may identify the document with video content by identifying the document from a predefined list of content providers' websites (e.g., websites of content providers 280). When identifying the document, crawler 285 may identify a "search" option on a website, which allows a search term to be entered, and returns search results.

A search of the website may be performed using one of the keywords from the aggregated keyword list as a search term. A search of the website may be done in an automated fashion. For instance, the keyword may be included in a Hypertext Transfer Protocol (HTTP) request that includes the keyword as a search term. In response to the HTTP request, video content provider 280 may return the identified document, which may identify one or more videos that correspond to the keyword. The identified document may include one or more web pages with links to videos that correspond to the keyword.

As an example, if identifying a document from video content provider YouTube, the keyword may be included in an HTTP request, in the format:

http://www.youtube.com/results?search_query=[keyword], (1)

where [keyword] is the keyword itself. Accordingly, for example, if the keyword is "Simpsons," the HTTP request may be:

http://www.youtube.com/results?search_query=Simpsons. (2)

A document may then be returned, which may identify one or more videos that are relevant to "Simpsons." Similarly, if the keyword is "Star Track," the HTTP request may be:

$$\text{http://www.youtube.com/results?search\_query=Star+Track.} \quad (3)$$

A document may then be returned, which may identify one or more videos that are relevant to "Star Track."

The identified document may be parsed to identify video content metadata in the document (block 515). Metadata associated with a particular video may include a title, a video publication date, a description, a length, a rating, a format, or any other type of metadata relating to the particular video. The identified document may also be parsed to identify video content location identifiers (such as URLs) for videos identified in the document (block 520).

By parsing the document, metadata and video content location identifiers for each specific video may be identified. Several techniques may be used in determining whether data that appears in the document is associated with video content, and, if so, with which video the data is associated. For instance, the structure of the document may be known based on an identity of the particular video content provider 280. Collection of metadata for one video may require identification and parsing of a chain of web pages and further aggregation of pieces of metadata extracted from several web pages.

If the document includes HTML, for example, the document of one particular video content provider 280 may include HTML tags that denote that metadata for a specific video appears within the HTML tags. For instance, the document may include HTML tags <div class="video-entry"> and </div> to denote that the data that appears between the tags is directed to a single video. The document may include several such pairs of tags, where each <div class="video-entry"> and </div> pair denotes a separate video. In another example of an HTML document, the document of another video content provider 280 may include the HTML tags <div style="overflow:auto;margin-top:20px;" id="[Video ID]"> and </div> (where [Video ID] is a unique identifier, assigned to the video) to denote that the data that appears between the tags is directed to a single video.

Each type, or category, of metadata may be specifically identified by HTML. For instance, HTML tag pair <p class="hovercard-description"> and </p> may identify video description metadata, while HTML tag pair <span class="hovercard-duration"> and </p> may identify video length metadata.

If the document does not include HTML, then another parsing technique may be used.

Advertisements may also be included within the documents, or even interspersed within metadata for particular videos. Such advertisements may be filtered out when identifying metadata associated with video content. For instance, any link, HTML tag, etc., that includes the word "advertisement," any permutation of the word "advertisement," such as "ad," or any other alphanumeric string that is used to reference and advertisement may be identified as an advertisement, or as non-metadata.

In addition to relying on HTML tags for identifying video content metadata, and/or for separating metadata from advertisements, the structure of the document may be used. For instance, in some implementations, the header, title, and/or footer of the document may be ignored, as these portions of documents may be assumed to lack relevant video content.

While the above description described metadata in terms of text, metadata may include other types of data. For example, in some implementations, metadata may include still, or moving, images (e.g., JPEG images, GIF images, etc). The images may include thumbnails that are associated with identified video content. In some implementations, the metadata may include the image itself, while in some implementations, the metadata may include a URL to an image.

Furthermore, parsing the document may include parsing multiple different web pages. For instance, a search for video content may yield several pages of results. In some implementations, only the first page (or a portion of the first page) is parsed. In other implementations, pages after the first page are parsed. The number of pages to parse may include a pre-set number of pages (e.g., 5, 10, or 25 pages). There may also be no pre-set limit to the number of pages to parse.

In some implementations, the parsing of documents from one video content provider 280 is performed using different rules from rules used when parsing documents of other video content providers 280. For example, two different video content providers 280 may use two different HTML tags to denote the title of a video. If a particular video content provider 280 has provided a particular document, crawler 285 may parse the particular document using the parsing rules designated for that particular video content provider 280. If a different video content provider 280 has provided a different document, crawler 285 may parse the different document using the parsing rules designated for the different video content provider 280 (e.g., by identifying different HTML tags than those identified in the other document from the other video content provider 280).

However, it is conceivable that a video content provider 280 may change the format of its documents, the coding of its documents, or both. In such scenarios, the parsing may not work properly. For example, a video content provider 280 may change its "title" tag from <p class="title"> to <p class="vidtitle">. When this happens, crawler 285 may detect that metadata is missing from an identified document. Upon detecting that too many documents (e.g., a single document, 3 documents in a row, 5 documents of the past 7 documents, etc.) from the same video content provider 280 have missing metadata, crawler 285 may generate an alert, which indicates that crawler 285 may not be configured to properly parse the documents provided by that video content provider 280. The alert may be transmitted to an administrator, who may review the documents with the supposed missing metadata. The administrator may then take remedial action, such as reconfiguring crawler 285 to properly parse the documents provided by that video content provider 280. Once the remedial action is taken, crawler 285 may re-evaluate the documents for which metadata was missing.

A format of the video content may be determined (block 525). In one implementation, crawler 285 may determine the format of video content by performing a look-up based on an identification of the video content provider 280 (e.g., by determining a domain name associated with the video content). For instance, certain video content providers 280 may only provide video content in one particular format. Also, or alternatively, crawler 285 may determine the format of video content by analyzing the metadata identified at block 515. For example, the metadata may indicate the video content format.

Also, or alternatively, crawler 285 may determine the format of the video content based on the content type of the video (which may be obtained by identifying a content type header, which may be obtained by accessing the video using the HTTP protocol), and/or on the video content location identifier. The video content location identifier may include the name of a video file that includes the actual video content. The file extension may be analyzed, and compared against a known mapping, of file extensions to file types, to determine the file type. For instance, a file extension of ".flv" may indicate that a video file is a Flash file, while a file extension of ".mpg" may indicate that the video file is an MPEG file.

Also, or alternatively, crawler 285 may determine the format of video content by determining the audio/video compression and decompression (codec) of a video file. This may be determined by using a software tool, such as a transcoder, which analyzes the video file in order to determine the codec.

Whether video content format is compatible with, for example, a video client 265 may be determined (block 530). For example, crawler 285 may compare the video content format (identified at block 525) to a list of video formats known to be compatible with video client 265.

If the video content format is compatible (at block 535—YES), the video location identifier and metadata associated with the video may be provided to search server 290 (block 540).

Upon receiving the video location identifier and metadata, search server 290 may index the received information, using one or more of a variety of indexing strategies. For example, search server 290 may store multiple tables, where each table is sorted by a different category. These categories may correspond to different elements of the received information. The sorting may be an alphabetical sorting. Each entry in the table may correspond to a specific video, and include some or all of the information (e.g., video location identifier and received metadata) received by search server 290 for that video. One of the tables stored by search server 290, for example, may be sorted by "title," while another one of the tables might be sorted by "length," while yet another table may be stored by "video ID."

By storing different tables of different categories, search server 290 may respond to user searches (in a process described in more detail below) more quickly than if the information was not stored in such a way. For instance, when attempting to locate a result for the video search query term "Batman," search server 290 may examine only the entries that are in close proximity, alphabetically, to "Batman" in order to determine if any entries match the video search query term. However, if the information was not sorted, search server 290 might have had to examine the stored information for every video each time search server 290 receives a video search query from a user. Thus, the indexing, which may be performed by search server 290, provides faster performance than if the indexing were not performed.

Search server 290 may store additional, or fewer, tables than described in the above example. Furthermore, search server 290 may store tables stored according to different categories than the ones provided in the above example. Search server 290 may use other indexing techniques instead of, or in addition to, the above described example. For instance, search server 290 may use hash tables, binary search trees, or the like.

A next document with video content (block 545) may be identified. This action may be similar to block 510, except different parameters may be used. For example, the same keyword may be used as in block 510, but at a different video content provider 280. Alternatively, a different keyword may be used from the one used in block 510, but at the same video content provider 280 as in block 510. Alternatively, a different keyword may be used at a different video content provider 280.

When attempting to identify the next document with video content (at block 545), it is possible that a particular keyword may yield no documents with video content. Process 500 may then attempt to identify another document with video content, so process 500 can continue. However, if encountering a lack of documents that include matching video content (e.g., 5 keyword searches in a row yielded no documents or too few documents, 10 keyword searches in a row, 15 of the last 20 keyword searches, etc.), process 500 may detect that too few documents are being returned. "Too few" documents may be a number of documents that are below a predetermined threshold.

Upon detecting such a condition, process 500 may re-initiate by attempting to identify a document with a control keyword. The control keyword may be a keyword in a predefined set of keywords, which are expected to yield a large number of results, and would thus be expected to always yield at least a minimal number of results (e.g., "Batman," "Obama," "racing," etc.). If still encountering, using control keywords, a lack of documents that include matching video content (e.g., 5 keyword searches in a row yielded no documents or too few documents, 10 keyword searches in a row, 15 of the last 20 keyword searches, etc.), process 500 may detect that too few documents are being returned, based on control keywords. If too few documents are returned, based on control keywords, this may indicate that one or more video content providers 280 have changed the format of their documents, and crawler 500 is not configured to parse the new format. An alert may be generated. Based on the alert, crawler 500 may be reconfigured to properly parse the new format, in order to continue identifying documents that include video content.

If the video content format is not compatible (at block 535—NO), then a next document with video content may be identified. For example, as described above, process 500 may repeat blocks 515-540 on the next identified document (identified at block 545). While blocks 515-540 were described above in the context of a single video (e.g., identifying metadata for a video at block 515, determining the format of a video at block 525, etc.), it should be understood that these blocks could each be performed for one or more videos on a single document, identified at block 510. For example, on a document that includes multiple videos, metadata and location identifiers (blocks 515 and 520) could be identified for some or all of the identified videos, the format of some or all of the videos could be determined (block 525), etc.

Figure 6:
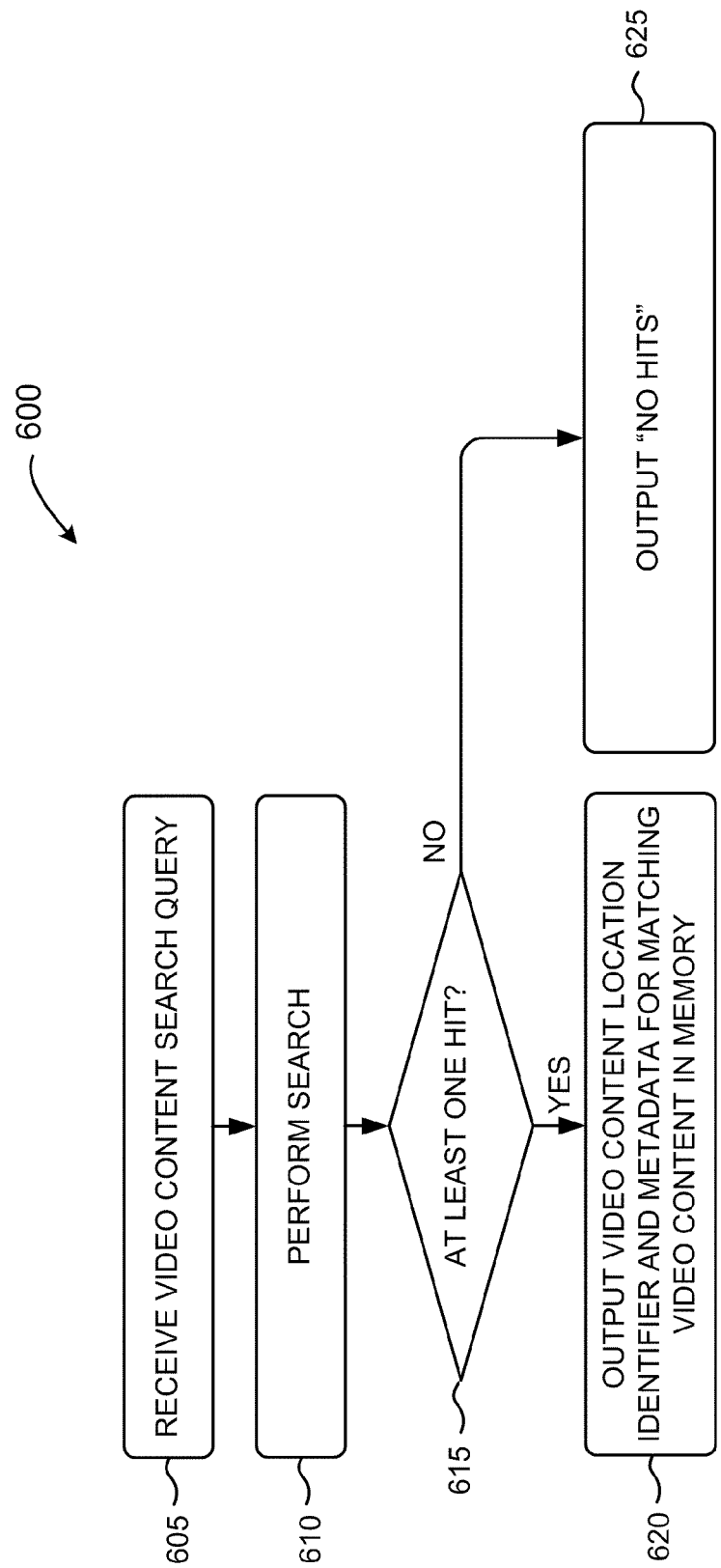
FIG. 6 is a flowchart of an example process for providing a video content location identifier and metadata in response to a video content search query.

FIG. 6 is a flowchart of an example process 600 for providing a video content location identifier and metadata in response to a video content search query. Process 600 may be performed by a search server, such as search server 290. In other implementations, process 600 may be performed by another device, or a set of devices, including or excluding search server 290. Process 600 may include receiving a video content search query (block 605). As will be further described below, this video content search query may be received from a user, via a video client 265. In one implementation, search server 290 may store the received video content video content search query in a log. As mentioned above, this log may be used in generating keywords for crawling.

A search, based on the received video content search query, may be performed (block 610). For example, search server 290 may search information, stored by search server 290, regarding videos. This information may include the video location identifiers and metadata provided by crawler 285 to search server 290 (e.g., at block 540). As mentioned above, this searching may be performed efficiently, due to indexing performed by search server 290.

If there are no results, or "hits" (at block 615—NO), for the video content search query (e.g., if none of the information stored by search server 290 matches the video content search query), then a message that indicates that there were no hits may be output (block 625). For example, search server 290 may output a message that indicates that there were no hits. Video client 265 may cause a message, indicating that there were no hits, on video display device 270.

If, on the other hand, there are one or more hits (e.g., videos for which information stored at search server 290 matches the video content search query) (at block 615—YES), video content location identifiers and metadata associated with the matching videos may be output (block 620). For example, search server 290 may output the video content location identifiers and metadata associated with the matching videos to a video client, such as video client 265. In some implementations, search server 290 may rank the hits based on some criteria (such as relevance to the video content search query, popularity of the hits, user rating of the hits, criteria that is based on past preferences of a user of video client 265, etc.).

In some implementations, process 600 may incorporate a filter, such as an adult content filter, in order to filter out offensive words. Offensive words may be words in a predetermined set of words that may not be suitable for some users. When determining whether there are any hits (at block 615), process 600 may ignore hits that include one or more offensive words (e.g., not include these hits when outputting the information at block 620). Process 600 may also involve receiving information from video client 265 that indicates whether or not the adult content filter is turned on (e.g., whether or not to filter out offensive words).

When providing the metadata associated with a particular video, search server 290 may output all of the stored metadata associated with the particular video. Alternatively, search server 290 may output only a portion of the stored metadata associated with the particular video. For example, when outputting the stored metadata, search server 290 may only output certain metadata (e.g., title, description), while not outputting other metadata (e.g., thumbnail image, length, director), that is associated with the particular video and is stored by search server 290.

Figure 7:
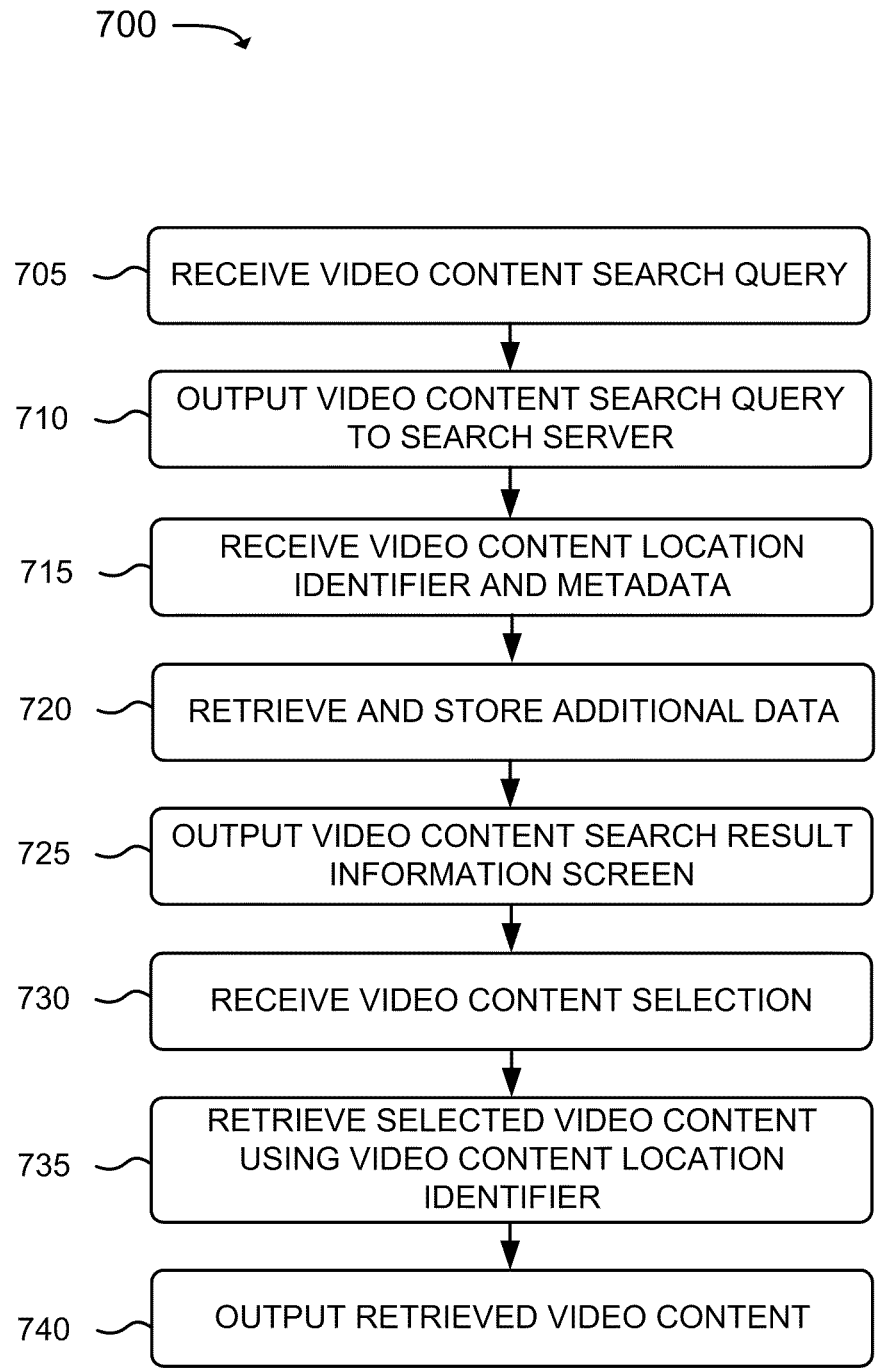
FIG. 7 is a flowchart of an example process for receiving a search query and outputting associated video content for display.

FIG. 7 is a flowchart of an example process 700 for receiving a video content search query and outputting associated video content for display. Process 700 may be performed by a video client 265. In other implementations, process 700 may be performed by another device, or a set of devices, including or excluding video client 265. Process 700 may include receiving a video content search query from a user (block 705). For example, a video client 265 may receive a video content search query from a user. The user may input the video content search query using an input device (e.g., remote control 275), which communicates with video client 265.

The video content search query may be output to search server 290 (block 710). For example, video client 265 may output the video content search query to search server 290 via a network (e.g., the Internet). Videos that are relevant to the video content search query may be identified. For example, search server 290 may perform process 600 to identify videos that are relevant to the video content search query. The user could also enter the video content search query in other ways (e.g., using buttons that are physically located on video client 265, using spoken words, etc.).

Video content location identifiers and metadata associated with videos that are relevant to the video content search query may be received (block 715). For example, video client 265 may receive the video content location identifiers and metadata from search server 290 via the network.

Additional data may be retrieved and stored (block 720). For example, video client 265 may retrieve the additional data through a network, such as the Internet. The additional data may include, or identify, Internet-accessible content, such as images. For example, received metadata (e.g., metadata received at block 715) may include a location identifier for a thumbnail image. Video client 265 may recognize that this location identifier is associated with a thumbnail image, and video client 265 may retrieve the thumbnail associated with the location identifier. Upon retrieval, video client 265 may store the retrieved thumbnail for subsequent use. The retrieved thumbnail may be presented as thumbnail 125 (in FIG. 1B).

In some scenarios, when attempting to retrieve additional data (block 720), the additional data may not be available. For example, the received metadata may include a broken or expired link. As another example, there may be a temporary connection issue. If video client 265 is unable to retrieve the additional data, video client 265 may make a number of additional attempts. Video client 265 may attempt to retrieve the additional data several (e.g., 3, 5, 7, etc.) times at a short interval (e.g., every 0.1 seconds, every 1 second, every 2 seconds, etc.), and then may attempt to retrieve the additional data again at a longer interval (e.g., every 5 seconds, every 10 seconds, etc.). This approach helps account for various different types of intermittent connection problems, which can be worked around simply by attempting to retrieve content at a later time.

Upon finding that certain additional content is not available, video client 265 may also send a request, to the search server 290, for the content. In some implementations, as mentioned above, the search server 290 may store additional data that is not initially provided to video client 265. The request for the missing content may include a request for content that is stored by the search server 290, but was not initially provided to video client 265 when video client 265 received video content location identifiers and metadata (at block 715).

A video content search result information screen may be outputted (block 725). The video content search result information screen may be output by video client 265 to a display device, such as video display device 270. In some implementations, the video content search result information screen may have a similar layout to the video content search result information screen illustrated in FIG. 1B. The information displayed on the screen may correspond to some or all of the metadata (received at block 715) and/or to some or all of the additional data (retrieved at block 720).

The layout of the video content search result information screen may be a pre-set layout. The layout of the video content search result information screen may be a user-specified layout. For instance, the layout may indicate that the title of a video is to appear in a specific visual location, while a thumbnail of the video is to appear in a different visual location. However, certain information that the layout relies upon may not be available. For instance, the layout for particular video content search result information 155-1, shown in FIG. 1B, indicates that a thumbnail 125 is to appear on the left-hand side of the layout. As discussed above, the thumbnail may not be available for a variety of reasons.

While video client 265 is attempting to retrieve the thumbnail (as described above), video client 265 may still display the other information available to video client 265. In other words, some missing information will not deadlock, or "hang," video client 265, such that video client 265 is simply waiting for all of the expected information before outputting the video content search result screen (at block 725). While the thumbnail is not available, video client 265 may display a placeholder (e.g., a red "X", the words "image not available," a default image, etc.) in the location in the layout designated for the thumbnail. Alternatively, video client 265 may simply display nothing, instead of the placeholder.

While the above example was described in the context of a missing thumbnail image, similar concepts could be applied for any missing metadata. For example, if a title of a video is missing, the video content search result information may display a placeholder (e.g., "title not available"), while video client 265 attempts to retrieve the title (e.g., by sending a request to the search server 290).

A video content selection may be received (block 730). For example, video client 265 may receive input from a user, via an input device (e.g., remote control 275) to select one of the videos displayed on the video content search result information screen.

The selected video content may be retrieved, using the video content location identifier associated with the selected video content (block 735). For example, video client 265 may use the video content location identifier to locate the video. As mentioned above, the video content location identifier may include a URL. In such an implementation, video client 265 may retrieve the video content pointed to by the URL.

If the video content is unavailable, video client 265 may make several attempts, in a manner similar to that described above, in order to retry retrieving the video. A video may be unavailable because it has been removed or has expired. A video may also be unavailable because of intermittent connection problems. While the video is being retrieved, a placeholder (e.g., "retrieving video," "video not available," etc.) may be displayed.

The retrieved video content may be outputted (block 740). For example, upon retrieving the video content, video client 265 may output the retrieved video content (e.g., to video display device 270). Video client 265 may also be configured with a video player that is capable of recognizing video content, and is capable of providing video-related functionality, such as pause, rewind, till screen, etc. When outputting the retrieved content (at block 740), video client 265 may receive user input corresponding to this functionality.

Video content may available intermittently, or for a limited amount of time. For example, a video may "expire" a certain amount of time after it is initially made available. Thus, it may be desirable to verify whether metadata is associated with video content is not associated with expired or unavailable video content.

Figure 8:
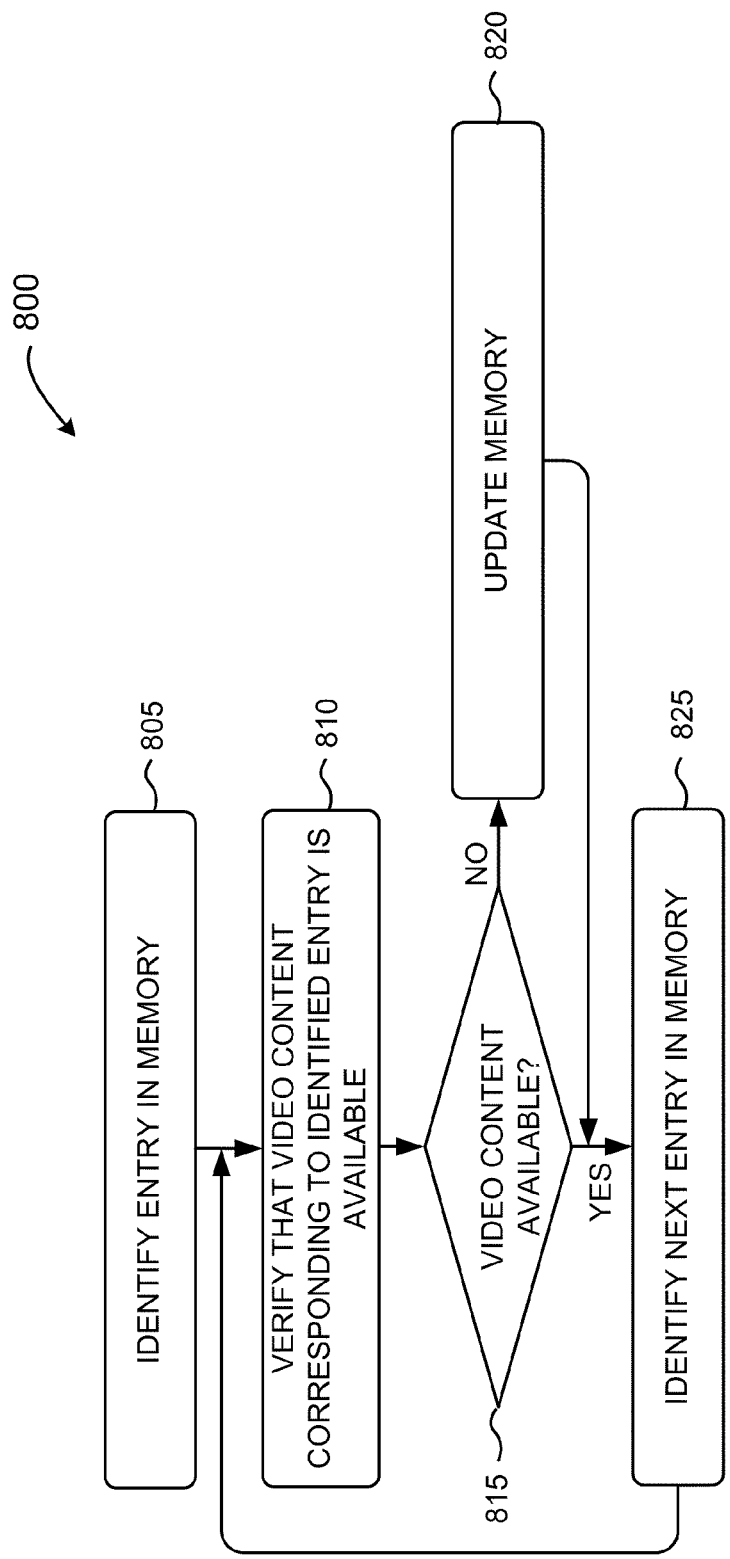
FIG. 8 is a flowchart of an example process for verifying whether video content, associated with an entry stored in memory, is available.

FIG. 8 is a flowchart of an example process 800 for verifying whether video content, associated with an entry stored in memory, is available. Process 800 may be performed by search server 290. In other implementations, process 800 is performed by crawler 285, another device, or a set of devices, including or excluding search server 290 and/or crawler 285. Process 800 may include identifying an entry in memory (block 805). The memory may be a memory associated with search server 290. An "entry" may correspond to a set of information (e.g., video location identifier and metadata), associated with a single video, in the memory.

Whether video content, corresponding to the identified entry is available, may be verified (block 810). For example, search server 290 may verify that the video content is available by using the video content location identifier for the video. If the video location identifier points to a location that does not include a video (e.g., the video may have expired, may have been removed, etc.), search server 290 may determine that the video content is not available. The determination may be made in other ways as well. For example, the video location identifier may point to a document that redirects to a "video not available" document. Furthermore, the video location identifier may be a "broken link" (i.e., a link to a document that does not exist). Search server 290 may make several attempts, in a manner similar to that described above, in order to verify that the link is not simply temporarily unavailable.

If the video content is not available (at block 815—NO), the memory (and/or another database, if another such database is used) may be updated (block 820). For example, search server 290 may remove the entry from the memory. In other implementations, search server 290 may flag the entry. A flagged entry may be an entry that is not used when providing video content search results. Furthermore, a flagged entry may be examined later, in order to determine whether the video content can be found and, if so, where the video content can be found. An alert may be generated in order to alert an administrator of a flagged entry. The flagged entry may then be reviewed and/or deleted at a later time.

If the video content is available (at block 815—YES), the next entry in the memory may be identified (block 825). For example, the search server 290 may identify the next entry in the memory. In this way, some or all of the information stored in the memory (e.g., in search server 290) can be continuously or regularly checked, in order to ensure that users are provided results with a higher degree of reliability, in terms of video availability.

Other checks may be continually or regularly performed on the information stored in the memory (e.g., associated with the search server 290), in order to ensure greater data reliability and relevance. For example, duplicate entries may be detected and deleted. In some implementations, search server 290 may find duplicate entries by finding entries with the same video ID, which is a unique ID that may be assigned to each video by its respective video content provider 280. In some implementations, search server 290 may find duplicate entries by finding entries with the same video content location identifier (which may include the video ID). Search server 290 may allow videos with same or similar metadata to remain in the memory. For example, two completely different videos may have the same title and description. It would be desirable not to remove one of those videos, as the videos are, in fact, not duplicates.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5-8, the order of the blocks may be modified in other implementations. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
    providing, by the server device, a search query to a website for obtaining video content corresponding to identifying information encoded by a first content provider;
    receiving, by the server device, first search results of a first search performed of the corresponding identifying information based on a keyword in the search query;
    determining, by the server device, that the first search results include fewer than a threshold number of search results;
    detecting, by the server device and based on the determining, that the video content provider has made a change to the encoding of the corresponding identifying information;
    providing, by the server device and based on the change to the encoding, a modified search query to the website for obtaining the video content;
    receiving, by the server device, second search results of a second search performed of the corresponding identifying information based on the keyword in the modified search query;
    determining, by the server device, that the second search results include at least the threshold number of search results;
    identifying, by the server device and based on a result of the modified search, first corresponding identifying information that identifies a set of video content, of the video content, related to the keyword;
    identifying, by the server device and based on the first corresponding identifying information, a format of a particular video content in the set of video content;
    comparing the identified format to a list of video formats that are compatible with a video client device;
    determining, by the server device and based on a result of the comparing, that the identified format is compatible with the video client device; and
    outputting, from the server device and responsive to determining that the identified format is compatible with the video client device, the first corresponding identifying information that identifies the particular video content and allows the video client device to access the particular video content via the website.

2. The method of claim 1, wherein the web site includes a web site page provided by the first content provider, the method further comprising:
    accessing a second website, provided by a second content provider, wherein the second website includes a search function;
    using the keyword as a search term for the search function of the second website; and
    initiating the search function of the second website based on the keyword.

3. The method of claim 2, further comprising:
    receiving, in response to initiating the search function of the second website, a document that includes a second set of video content, provided by the second content provider, that is related to the keyword.

4. The method of claim 1, wherein the first corresponding identifying information includes a Uniform Resource Locator (URL) that points to the particular video content.

5. The method of claim 1, further comprising:
    identifying metadata in the first corresponding identifying information that is associated with the particular video content; and
    outputting the metadata responsive to determining that the identified format is compatible with the video client device.

6. The method of claim 1, wherein determining that the identified format is compatible comprises:
    determining a compression/decompression (codec) of the particular video content; and
    comparing the determined codec to a list of codecs that are compatible with the video client device.

7. The method of claim 1, where the video client device includes a set-top box.

8. The method of claim 1, further comprising periodically determining whether the particular video content is available via the website.

9. A method performed by a server device, the method comprising:
    accessing, by the server device, a first website that hosts a first plurality of video content and a second website that hosts a second plurality of video content, wherein the first website corresponds to a first video content provider and the second website corresponds to a second video content provider;
    causing, by the server device, a search to be performed of the first and second websites based on a keyword in a set of keywords;
    identifying, by the server device and based on a result of the search, a first particular document that provides a first set of video content, of the first plurality of video content, and a second particular document that provides a second set of video content, of the second plurality of video content, related to the keyword;
    parsing, by the server device and respectively using a first set of rules corresponding to the first video content provider and a second set of rules corresponding to the second video content provider, the first particular document to identify a first particular video content in the first set of video content, and the second particular document to identify a second particular video content in the second set of video content, wherein the first set of rules differs from the second set of rules;
    further parsing, by the server device and respectively using the first set of rules and the second set of rules, the first particular document to identify first metadata associated with the first particular video content and the second particular document to identify second metadata associated with the second particular video content;
    detecting, by the server device, that the second metadata does not include an entirety of metadata that identifies the second particular video content;
    determining, by the server device and responsive to the detecting, that the second set of rules are not current for use in the further parsing of the second particular content;
    determining that a third set of rules are current for use in the further parsing of the second particular content, wherein the third set of rules differs from the second set of rules; and re-parsing, by the server device and based on the third set of rules, the second particular document to identify third metadata associated with the second particular content, wherein the third metadata differs from the second metadata.

10. The method of claim 9, wherein the parsing includes:
identifying information in the first particular document that is not associated with the first particular video content, wherein the information that is not associated with the first particular video content is not stored by the server device.

11. The method of claim 10, wherein the information that is not associated with the first particular video content includes an advertisement.

12. The method of claim 9, where the set of keywords includes one or more terms from a search log.

13. The method of claim 9, further comprising:
analyzing a word of the day document to determine a word of the day provided by the word of the day document; and
including the word of the day in the set of keywords.

14. The method of claim 9, further comprising:
identifying a popular search term received by one or more search engine providers; and
including the identified popular search term in the set of keywords.

15. The method of claim 9, wherein the parsing includes identifying a particular portion of the first particular document, and wherein the further parsing the first particular document includes not parsing the identified particular portion unrelated to the first particular video content or the first metadata.

16. The method of claim 14, where identifying the particular portion includes identifying that the particular portion includes an advertisement.

17. A system, comprising:
one or more server devices comprising:
means for receiving a set of keywords;
means for accessing a website, associated with a video content provider, that hosts a plurality of video content;
means for causing a search to be performed of the website based on a keyword in the set of keywords;
means for identifying, based on a result of the search, a particular document that corresponds to a set of video content, of the plurality of video content, related to the keyword;
means for parsing the particular document to identify particular ones of video content in the set of video content;
means for further parsing the particular document to identify metadata associated with each one of the particular ones of the video content;
means for detecting that metadata associated with one or more of the particular ones of the video content is missing from the identified metadata;
means for determining that missing metadata has been detected for more than a threshold number of documents associated with the video content provider;
means for re-parsing, based on the detecting and determining, the particular document to identify the missing metadata associated with each one of the particular ones of the video content;
means for storing the identified metadata and information that identifies each one of the particular ones of the video content;
means for identifying a format of each one of the particular ones of the video content;
means for determining that the format of a first one of the particular ones of the video content is compatible with a video client device, and determining that the format of a second one of the particular ones of the video content in not compatible with the video client device; and
means for outputting identifying information that identifies the first one of the particular ones of the video content and not outputting identifying information associated with the second one of the particular ones of the video content, wherein the outputted identifying information allows the video client device to access the first one of the particular video content.

18. The system of claim 17, wherein the means for parsing includes:
means for identifying other information, in the particular document, that is not associated with the particular ones of the video content, wherein the other information is not stored by the one or more server devices.

19. The system of claim 18, wherein the other information includes an advertisement.

* * * * *